United States Patent [19]

Focke et al.

[11] Patent Number: 4,613,033
[45] Date of Patent: Sep. 23, 1986

[54] APPARATUS FOR THE INTRODUCTION OF OBJECTS, ESPECIALLY PACKETS, INTO A PACKET TOWER

[75] Inventors: Heinz Focke, Verden; Hugo Mutschall, Kirchlinteln, both of Fed. Rep. of Germany

[73] Assignee: Focke & Co., (GmbH & Co), Verden, Fed. Rep. of Germany

[21] Appl. No.: 647,494

[22] Filed: Sep. 5, 1984

[30] Foreign Application Priority Data

Sep. 20, 1983 [DE] Fed. Rep. of Germany ....... 3333884

[51] Int. Cl.$^4$ ............................................. B65G 47/26
[52] U.S. Cl. .................................. 198/457; 198/478.1; 414/69; 414/37; 414/131
[58] Field of Search ............... 198/488, 489, 598, 457, 198/372, 478.1, 479.1; 271/178, 180, 3.1; 414/81, 107, 86, 91, 69, 37, 131

[56] References Cited

U.S. PATENT DOCUMENTS

| 2,439,040 | 4/1948 | Cohen | 414/131 X |
| 2,698,694 | 1/1955 | Schwartz et al. | 414/107 |
| 2,844,373 | 7/1958 | Van Marle | 271/178 |
| 3,904,077 | 9/1975 | Lubinbühl | 414/107 X |
| 4,069,928 | 1/1978 | Teske et al. | 198/598 X |

FOREIGN PATENT DOCUMENTS

| 1063528 | 8/1959 | Fed. Rep. of Germany | 414/37 |
| 191387 | 6/1967 | U.S.S.R. | 198/457 |

Primary Examiner—Joseph E. Valenza
Assistant Examiner—D. Glenn Dayoan
Attorney, Agent, or Firm—Sughrue, Mion, Zinn, Macpeak, and Seas

[57] ABSTRACT

For diversion of packets (10) from an input conveyor track (11) into a further conveyor track directed transversely to it, especially into a vertical packet tower (12) leading downwards, there serves a diversion apparatus, which consists of a plurality of rotating abutments (19a, 19b...). One abutment (19a, 19b...) at a time controls the movement of the packet (10a) which is foremost in the direction of conveyance, with alignment on an entrance opening (14) to the packet tower (12). Furthermore, the packet (10a) is introduced into the packet tower by the abutment.

10 Claims, 5 Drawing Figures

APPARATUS FOR THE INTRODUCTION OF OBJECTS, ESPECIALLY PACKETS, INTO A PACKET TOWER

The invention relates to an apparatus for diversion of objects, especially packets, from an input conveyor track into a further conveyor track lying at right angles thereto, especially into a vertical (packet) tower, out of which the packets can be carried away on an output conveyor track, preferably at the lower side.

In the packaging art, the need arises very often, and in various connections, to divert packets, which are supplied along a track, into a horizontal or vertical direction transverse to the input conveyor track, and to carry them further. At the same time there is often a difference in level to be overcome, either additionally or as the main purpose. Furthermore, in many cases a different orientation of the packets relative to the direction of conveyance is required in the output conveyor track than in the input conveyor track.

The invention deals with an apparatus which can be installed in conjunction with a packaging machine or a packaging line. It is a question of diverting block-shaped objects, especially packets, which are conveyed singly or close together on an input conveyor track, preferably horizontal, out of the direction of the input conveyor track, and conveying them further. Because of the high outputs of packaging machines, such an apparatus should be correspondingly productive, but yet should avoid undesired mechanical wear of the packets, which are often delicate. In this lies the problem underlying the invention.

For solving it, it is proposed, according to the invention, that the packets can be conveyed from the input conveyor track against an abutment which is moved in the zone of an entrance to the further conveyor track (packet tower), and which periodically moves with the packets in the direction of movement of the packets, while the foremost packet at the time engages against the abutment.

The inventive concept accordingly consists in guiding the packet which is foremost in the direction of the input conveyor track and is to be diverted in the zone of transfer into the further conveyor track (tower) directed at right angles, by means of an accompanying abutment which has a slightly lower speed of movement than the input conveyor track. After attainment of a predetermined relative position with reference to the entrance to the further conveyor track, the pushing of the respective packet into it follows.

According to a further proposal of the invention, a plurality of abutments are arranged on a common carrier, especially on the periphery of a revolving abutment disc. Then the abutments are formed as saw-tooth-like projections with equal spacings along the periphery, and are arranged with such a spacing from one another that a following abutment holds the packets following the foremost one at a distance, so that the packet held ready at any time in the zone of the entrance to the tower can be pushed into the tower, freely and separated from the following packets.

According to a further proposal of the invention, the abutments, i.e. the abutment disc, act also as a pushing member for the packets into the further conveyor track, i.e. into the tower. For this purpose the abutment disc is movable up and down—in addition to the rotary drive. Preferably the abutment disc is journaled at one end of a (two-armed) swinging lever, which performs a suitable movement, especially one directed downwards, for pushing a packet into the tower or the like. The shape and dimensioning of the abutments then ensure that each two abutments with spacings from one another engage the relevant packet on the (upper) face. By this means the packet is introduced into the tower without tilted position and canting.

A further important feature of the invention lies in the fact that the foremost packet at any time to be pushed into the further conveyor track is held still in the zone of the entrance, especially by lateral yielding holding jaws, which grip the packet on opposite faces. By the pushing movement, especially downward movement, of the pushing-in member (abutment disc), the relevant packet is pushed out of the zone between the holding jaws, while these preferably yield resiliently.

Further features of the invention relate to the shape of the abutments, of the abutment disc, to the drive of the latter, and also to the construction of the tower as preferred embodiment of a vertical further conveyor track. An embodiment of the apparatus will be explained in more detail with reference to the drawings.

Figure 1:
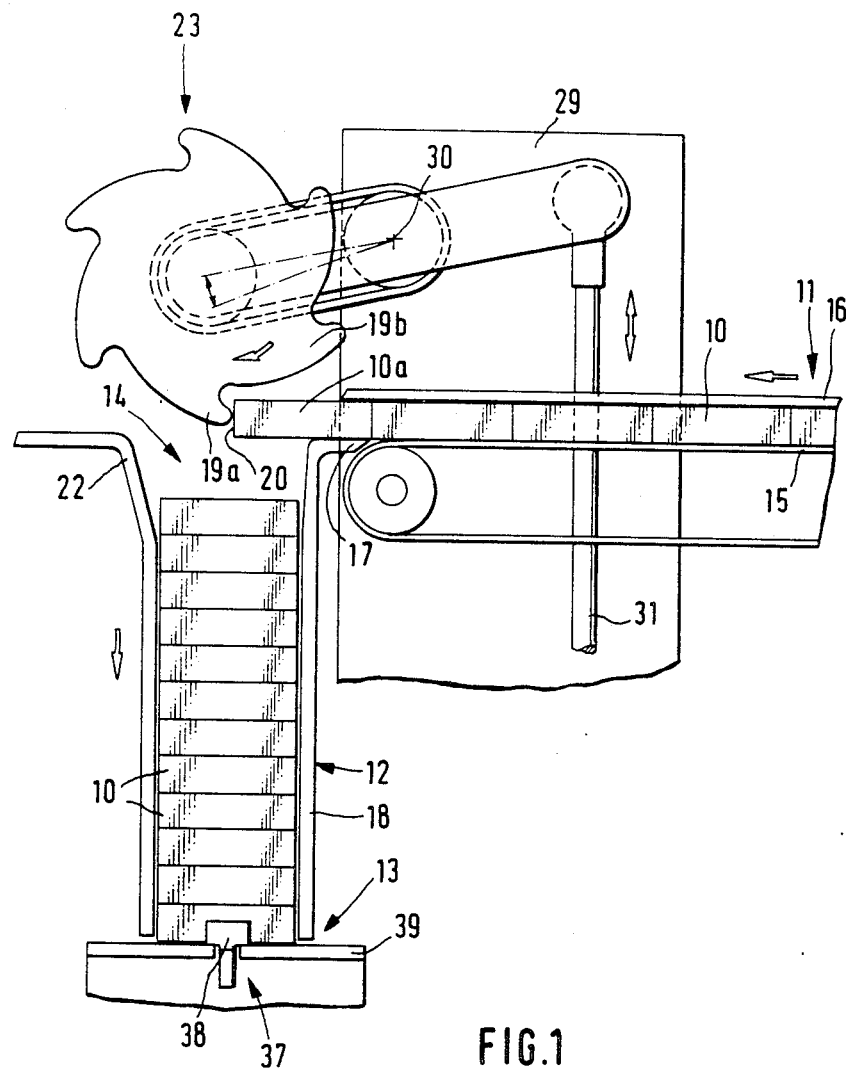
FIG. 1 shows the apparatus in schematic side elevation.

The preferred embodiment of the invention is shown in the drawings. It is a question of feeding rectangular packets 10, which are supplied close together along an input conveyor track 11, into an upright packet tower 12 from above. Accordingly, in the area of the input conveyor track 11, the packets 10 need to be diverted in the transverse direction relative to the conveying direction, without performing a rotary movement, and in fact in the downward direction. At the lower end of the packet tower 12, the packets 10 are removed from the packet tower 12 by an output conveyor 13, and conveyed away transversely to the packet tower 12, that is in a horizontal plane again. The conveying direction of the output conveyor 13 is directed—as seen in plan—at 90° to the input conveyor track 11. The packets 10 are accordingly not only conveyed further transversely to the original conveying direction, but are furthermore displaced in the vertical sense by the packet tower 12 acting as intermediate or further conveyor. For introduction of the packets 10 into the packet tower 12, that is into an upper entrance opening 14 of the latter, special means are resorted to, which ensure fault-free direction and centering of the packets 10.

In the present embodiment, the input conveyor track 11 is formed as a belt conveyor 15, with an upper guide 16. The packets 10 are conveyed by the belt conveyor 15 as far as one edge of a vertical tower wall 18, i.e. a laterally directed flange 17 of that wall. In this zone the packet 10a, which is foremost at the time of the row of packets, runs against a movable abutment 19a. This is moved substantially in the direction of movement of the packet 10, thus accompanying it, but with a (slightly) lower linear velocity than the packet 10a. Thus, with regard to relative position, this packet is guided by the abutment 19a with contact of a front end face 20 against it. The packet 10a is conveyed as far as an eccentric position relative to the packet tower 12, namely to a vertical central plane 21 of the latter—and beyond this central plane 21. For this purpose, the tower walls 18 in the zone of the entrance opening 14 are formed with a greater transverse dimension, namely with a funnel-shaped entry 22.

Figure 5:
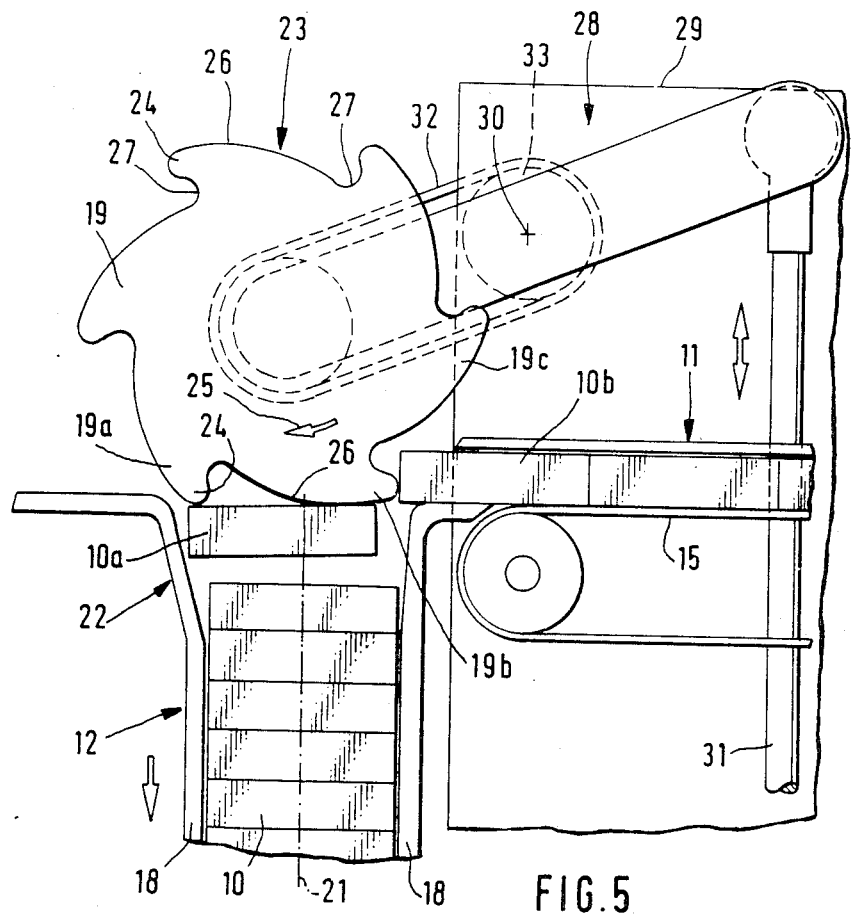
FIG. 5 is a view corresponding to FIG. 4, with further altered relative position of the relevant components.

After reaching roughly the relative position corresponding to FIG. 5, the foremost packet 10a is lowered into the packing tower 12. During this, the tower walls 18 converging in the upper zone, i.e. the funnel-shaped entry 22, perform an alignment of the packet 10a on the central plane 21.

Figure 2:
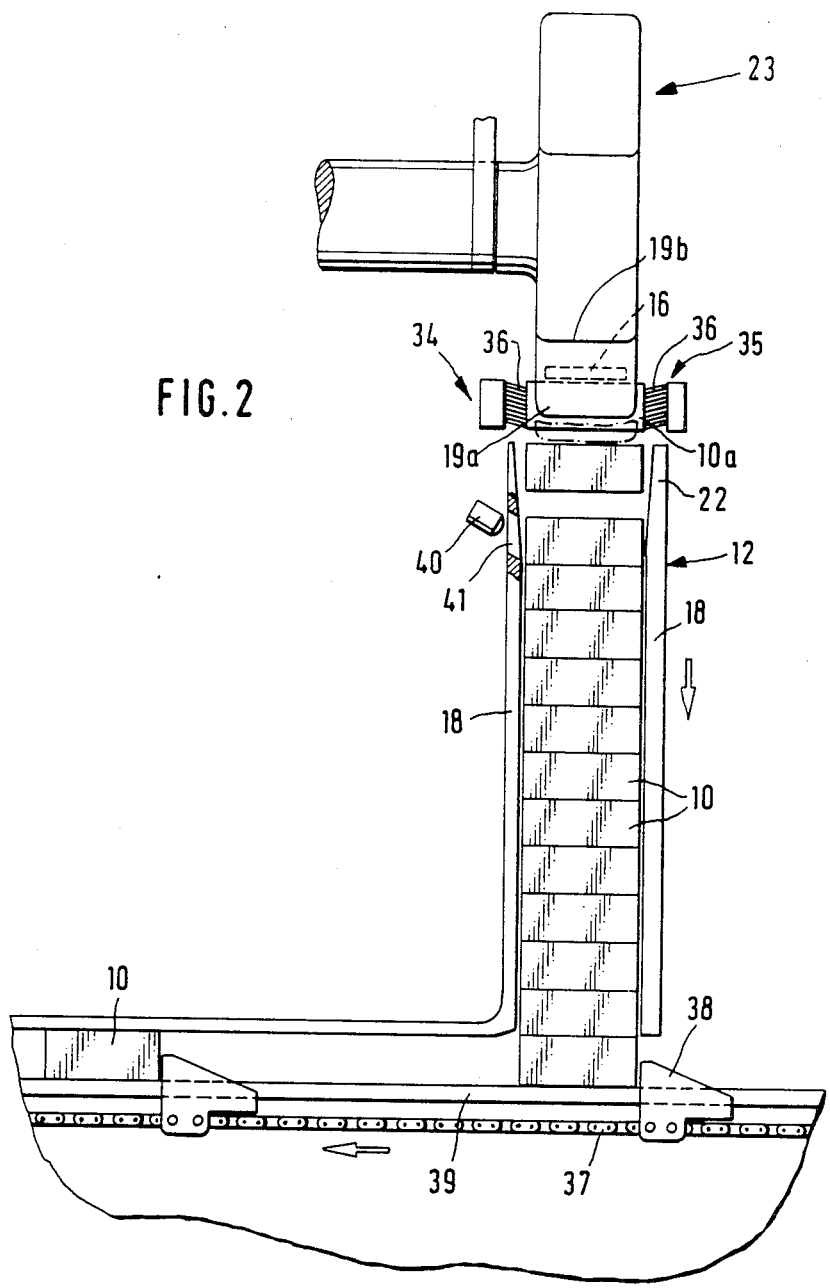
FIG. 2 shows a front elevation of the apparatus, displaced at 90° to FIG. 1.
Figure 3:
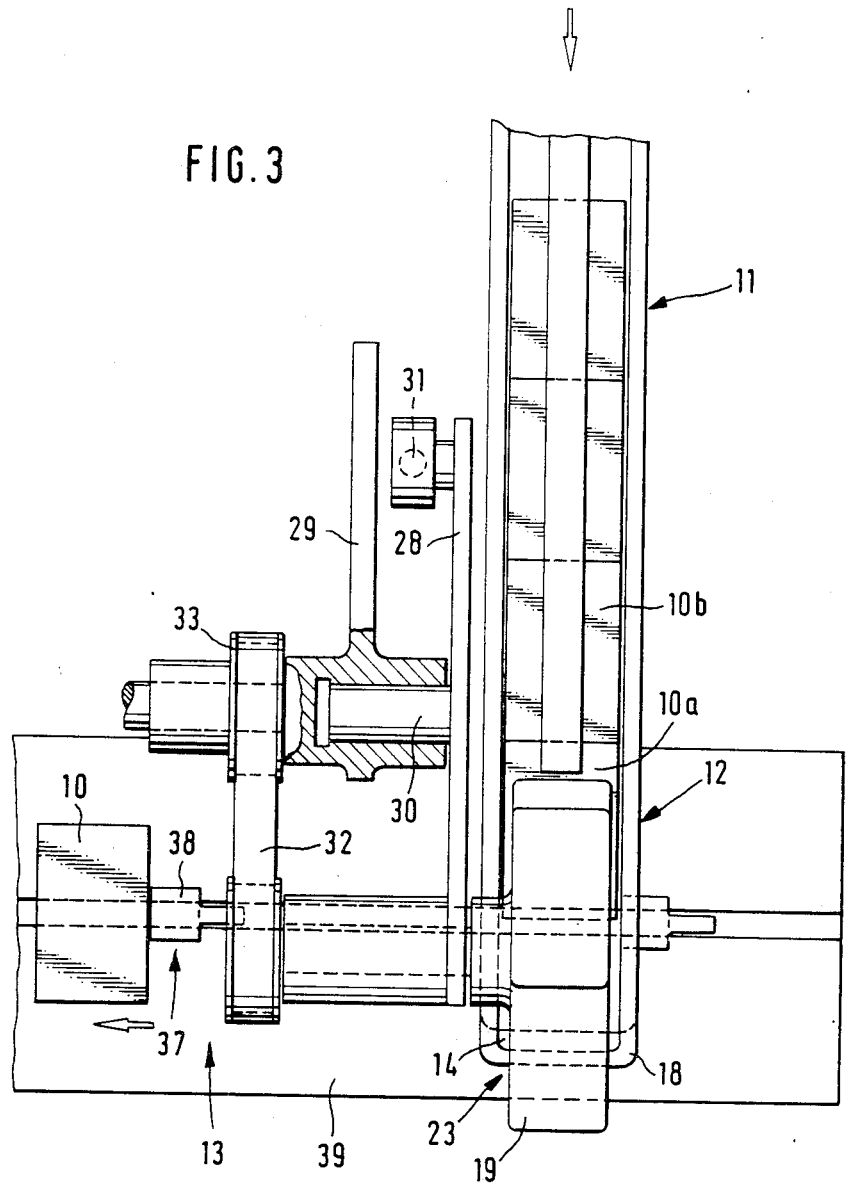
FIG. 3 shows a ground plan of the apparatus according to FIGS. 1 and 2.
Figure 4:
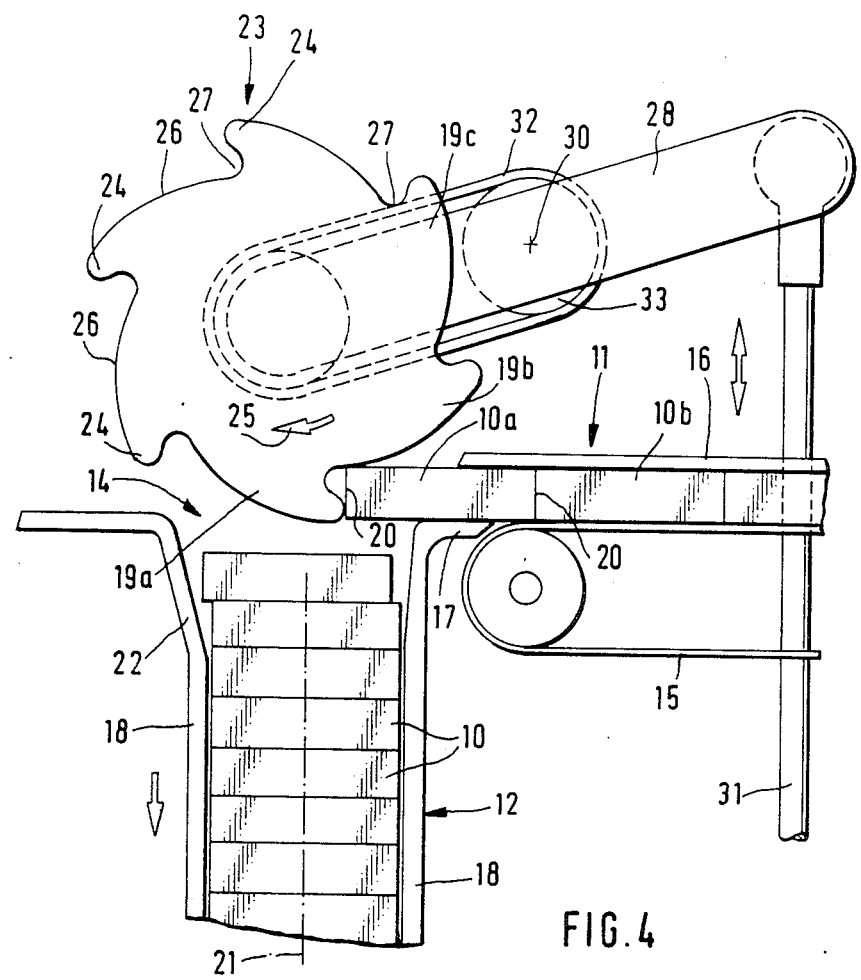
FIG. 4 shows a detail of the apparatus, on an enlarged scale, with altered relative positions of individual components, with enlarged scale.

The abutment 19a is installed on a rotating abutment carrier, in the present case an abutment disc 23. This has a transverse dimension (thickness) which corresponds closely to the internal width of the packet tower 12 in the associated direction (FIG. 2). Along the periphery, the abutment disc 23 is provided with a plurality of abutments 19a, 19b, 19c . . . , arranged at equal distances from each other. In side view, the abutments 19a, 19b . . . are formed nearly like a saw tooth, with a projecting nose 24 facing the packet 10, 10a arriving at that time, against which the packet 10a makes direct contact with its front end face 20. With reference to the direction of rotation of the abutment disc 23 (arrow 25), the nose 24 is like a projection facing backwards. The back 26 of the abutment 19a, 19b . . . , in the present case made of arcuate shape, joins onto the nose 24, in each case on the radially outer side. This back merges in an arc with a hollow 27, which limits the nose 24 at the inner side and is also arcuate.

By the projectingly shaped formation of the abutments 19a, 19b . . . , and also by their spacings in the circumferential direction, i.e. in the conveying direction of the packets 10, 10a, the result is obtained that an abutment 19b then following arrives in a position (FIG. 5) in which the following packets, i.e. the packet 10b which is then foremost, is engaged by this abutment 19b. The packet 10a lies centrally, in a position in the zone of the entrance opening 14, displaced relatively to the central plane 21 in which the downward movement within the packet tower 12 follows.

For this purpose likewise, in the present embodiment the abutment 19a, 19b . . . , i.e. the abutment disc 23, is provided. The abutment 19a associated with the packet 10a is moved so far in the meantime, that the nose 24 is in upward motion along the arcuate movement path. At the same time the back 26 of the following abutment 19b has moved so far downwards, that the latter makes contact with the upper face of the packet 10a in a zone which is rearward relative to the direction of movement (FIG. 5). Moreover the nose 24 of the preceding abutment 19a is roughly in the same plane, i.e. at the upper face of the packet 10a. Then the packet 10a is introduced into the packet tower 12 by downward movement of the abutment disc 23. In this way the packet 10a is engaged on its upper face by the nose 24 of the abutment 19a and the back 26 of the abutment 19b, in a stable manner and without risk of tipping.

In order to perform this pushing movement, the abutment disc 23 is journaled so as to move up and down, in the present case on a two-armed swinging lever 28. This is journaled by a pivot bearing 30 on a support plate 29 of the machine frame. Swinging movements of the swinging lever 28 are produced via a push rod 31, movable up and down, and these lead to an up and down movement of the abutment disc 23.

A rotary drive in the form of a (toothed) belt pulley 32 transmits the rotary motion to the abutment disc 23. A driving pulley 33 for this is arranged near the pivot bearing 30.

The packet 10a which is then foremost in the direction of conveying is releasably held in the zone above the entrance opening 14—about at the height of the plane of the input conveyor track 11—until the push into the packet tower 12. For this purpose, lateral holding jaws 34 and 35 are arranged in prolongation of the input conveyor track 11, on both sides of the movement track of the packet 10a. In the embodiment shown, these are provided with elastic holding means, in the present case brushes 36, on the sides facing the side faces of the packets 10, 10a . . . By these the packets are gently held. During the pushing movement of the packets into the packet tower 12 by the abutment disc 23, the relevant packet 10a is pushed out of the holding position between the brushes 36.

At the lower end of the packet tower 12, the packets 10, which have been assembled close together in the packet tower, one above the other, are conveyed away singly by the output conveyor 13, in a direction transverse to the input conveyor track 11. In the present case the output conveyor is formed as a chain conveyor 37. Dogs 38 engage the lowermost packet 10 at the time, and convey it away. For this purpose, the packet tower 12 ends with a corresponding spacing above a slide track 39 for the packets.

The degree of filling of the packet tower 12 is monitored, in fact by a light barrier, which detects the uppermost packet in the packing tower 12 at the time, by means of a transmitter 40 through an opening 41 in the tower wall 18.

We claim:

1. A device for diverting packages from a first conveyor into the top open end of a second conveyor, arranged perpendicular to said first conveyor, the packages being removed from the lower end of the second conveyor, comprising:

(a) in the area between said first conveyor (11) and the top open end (14) of said second conveyor (12), a plurality of movable abutments (19a, 19b . . . ) arranged to move in the movement direction of said packages while conveyed by said first conveyor, when said abutments contact the front end face (20) of said packages, (b) said movable abutments (19a, 19b . . . ) being arranged along the circumference of a rotating abutment disc (23), (c) means for reversibly moving the abutment disc (23) toward and away from said second conveyor to allow insertion of the packages (10a) into the top open end of said second conveyor (12), (d) in the area of the top open end (14) of said second conveyor (12) flexible holding jaws (34, 35) for temporarily holding each package (10a) in a friction-tight manner in the plane of the first conveyor (11) until insertion into said second conveyor (12), and (e) means to rotate said abutment disc.

2. The device according to claim 1, wherein said flexible holding jaws include brushes (36) for grabbing a package under friction along its lateral surfaces.

3. The device according to claim 1, wherein said abutments (19a, 19b . . . ) are constructed in a saw-tooth like shape with rounded protrusions (24) at the tip ends thereof and arc-shaped pressure surfaces adjoining said tip ends.

4. The device according to claim 3, further including means for causing the arc-shaped pressure surface (26) of an abutment to rest on the upper side of a package in the area of the top open end (10) and for lowering said abutment disc (23) for insertion of a package (10a) into said second conveyor (12).

5. The device according to claim 1, wherein the distance between the tip ends of the abutments (19a, 19b, 19c . . . ) are determined so that, with the downward motion of the abutment disc (23), two adjacent abutments (19a, 19b) rest against the upper side of a package (10a) with the protrusion of one abutment and the arc-shaped pressure surface of the adjacent abutment resting on a package.

6. The device according to claim 1, wherein said reversibly moving means comprises a two-armed pivoting lever (28).

7. The device according to claim 6, further including a pivot bearing (30), a driving pulley (33) connected to said pivot bearing and a driving belt (32) connected to said pulley (33) for turning said abutment disc (23).

8. The device according to claim 1, wherein said abutments are arranged evenly distributed, at a distance from each other along the circumference of the abutment disc (23).

9. The device according to claim 1, wherein said second conveyor (12) is constructed in the shape of a funnel (22) in the area of the top open end thereof (14).

10. The device according to claim 1, further including a removal conveyor (13), adjoining the lower end of said second conveyor and located perpendicular to said second conveyor.

* * * * *